United States Patent [19]

Aman et al.

[11] Patent Number: 5,307,294

[45] Date of Patent: Apr. 26, 1994

[54] AUTOMATED END TALLY SYSTEM

[76] Inventors: James A. Aman, 134 Bridle View Way, Souderton, Pa. 18964; William R. Haller, 425 Brighton St. #403, Bethlehem, Pa. 18015

[21] Appl. No.: 995,024

[22] Filed: Dec. 22, 1992

[51] Int. Cl.$^5$ .......................................... G01B 11/02
[52] U.S. Cl. ................................................ 364/560
[58] Field of Search ............... 364/555, 560; 250/223, 250/214 A; 356/385, 355; 378/4; 377/24, 6

[56] References Cited

U.S. PATENT DOCUMENTS

| | | | |
|---|---|---|---|
| 4,011,447 | 3/1977 | Henderson | 250/214 A |
| 4,408,883 | 10/1983 | Iwamoto et al. | 356/355 |
| 4,911,307 | 3/1990 | Jennings | 356/385 |
| 5,017,773 | 5/1991 | Sato | 250/223 |
| 5,023,895 | 6/1991 | McCroskey et al. | 378/4 |

*Primary Examiner*—Jack B. Harvey
*Assistant Examiner*—Thomas Peeso

[57] ABSTRACT

Either a focused beam (22) or a spatial (42) movable scanning unit which is attached to a moveable horizontal arm (27) which is attached to a stand (26) such that the scanning unit can be controllably directed throughout a prescribed vertical-horizontal plane which is parallel to one end of a unit of lumber (10). Separate stands (26) are placed at either end of the unit (10). Throughout the automatic directed movement, the scanning unit either emits focused beam (38) and/or receives reflected energy beams (38 and 48) which have reflected off the end of unit (10). These reflected beams are in accordance with the surface pattern of unit (10) and are input to a topological processor (22b or 42b) which translates this information into the geometric attributes of thickness, width and length. The exact count of distinct pieces of lumber of distinct geometric attributes is then transmitted to computer (28) as the unit's end tally. The computer (28) may accept related information through input means of a keypad (33) or bar code reader (34). The unit's end tally and related information may be transmitted via a bi-directional communications link (36) to a companion computer system which may in return transmit an associated identification number to be assigned to unit (10). Any or all of this determined and collected information may also be transmitted via link (36) to an automatic tagging sub-system (60). This sub-system is capable of printing tag (11) which is taken by grasping and stabling hand (72) which is further attached to movable arm (70) such that sub-system (60) may then automatically stable tag (11) to unit (10).

36 Claims, 7 Drawing Sheets

AUTOMATED END TALLY SYSTEM

FIELD OF INVENTION

The present invention relates to electronic systems for counting bundled lumber, the count of which is specifically referred to as an "end tally".

DESCRIPTION OF PRIOR ART

Lumber is most often transferred from primary manufacturer, to secondary manufacturer, to wholesaler and finally to retailer in bundled units. These units typically consists of lumber which is at least the same species, grade and thickness. When leaving the primary manufacturer, i.e. a sawmill, the units are of both random width and length. The secondary manufacturer, e.g. a kiln and/or surfacing yard, will usually regrade and repack the original units prior to shipping them to the wholesaler. As an added service, they may also sort the lumber into fixed width, two length packs. The wholesaler may then repackage these units into fixed width and fixed or two length packs, if this has not already been done. Hence, each step in this process will usually involve at least the repackaging of the bundled units.

This repackaging creates a need to have the units counted so that they can be accurately billed. Without any assistance, the counting process involves determining how many pieces of lumber are in each unit for each combination of widths and lengths. This is relatively easy if all the pieces of lumber in the unit are of one width and length. However, this process may take over ten minutes per unit and is subject to human error if the unit has many widths and lengths. This unit count, referred to as an "end tally", is very often the sole job of an individual at a lumber yard and as such is a value added service which directly or indirectly adds to the cost of processing.

Prior art exists which attempts to speed the rate at which units can be counted. One of the first such systems is known as the Sky Tally and consists of an "electronic ruler" which is connected to a portable computer. This system also includes a headphone which the yard man wears during the counting process. The Sky Tally instructs them to "count all eight foot pieces" after which they hold the ruler up to all "eight footers", measuring their widths. Instead of having to write the width on a "tally card" as with a manual system, they simply press the ruler at the appropriate point thus indicating the piece's width. This system provides further advantage in that it can hold several "tallies" at a time and can transfer this information onto a companion computer which then prints out "tags" and maintain the yards inventory. At least two other similar systems exist from Createc Forestry Systems and Multitech Systems, Inc.

However, with such systems, it may still take between five to ten minutes for a yard man to count a unit and the resulting count is still subject to human error. Depending upon the size of the yard, more than one individual may be employed just to perform this function. Depending upon the value of the lumber, the error in the final count can result in significant lost revenue or subsequent disputes with the over billed customer. Given the current state of the art in electronic measurement devices, it is possible to create an entirely automated "end tally" system which counts each unit within seconds - thus vastly increasing throughput and accuracy while also reducing overhead costs.

OBJECTS AND ADVANTAGES

Accordingly, the objects and advantages of the present invention are:

1. to provide a system for counting units of lumber without the aid of a human;
2. to provide a system for counting units of lumber with minimum errors;
3. to provide a system which can perform at the highest possible throughput by counting a unit in the shortest possible time;
4. to provide a system capable of quick entry of information related to the tagging function;
5. to provide a system capable of an interface with a companion inventory control system; and
6. to provide a system capable of immediately generating and tagging the counted unit without the aid of a human.

Further objects and advantages are to provide a system with a minimum of moving parts capable of withstanding a large variation of weather conditions. Still further objects and advantages of the present invention will become apparent from a consideration of the drawings and ensuing description.

SPECIFICATION

Figure 1:
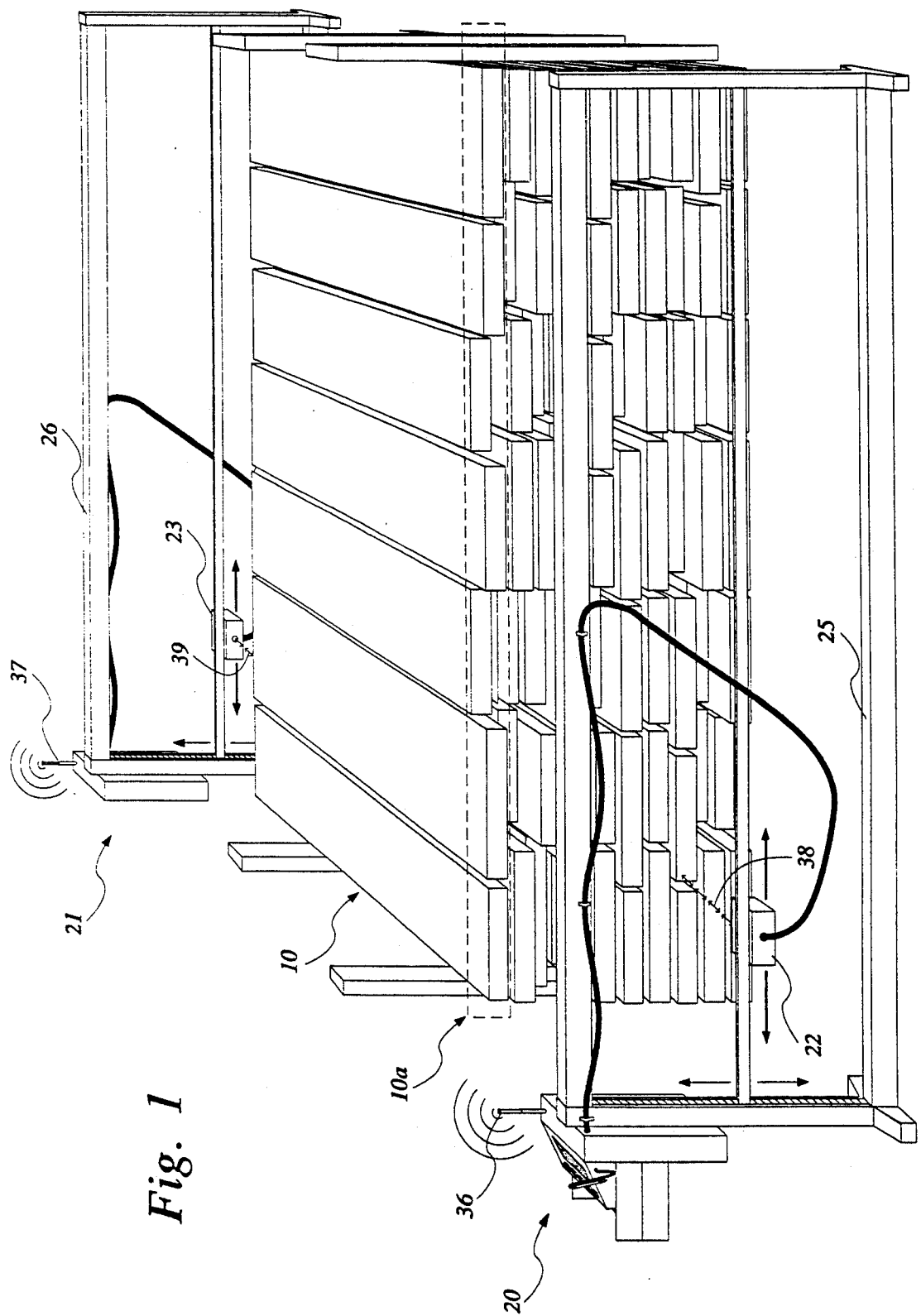
FIG. 1 is a perspective diagram of a stationary "end tally" system based upon a movable focused beam scanning unit placed at each end of a bundle of lumber. The system includes the additional parts of a wand for scanning bar codes, an input keypad, a display screen and a wireless transmission sub-system for communicating with a companion computer system.

Referring to FIG. 1 there is shown a perspective drawing of an embodiment 20 and 21 of the Automated End Tally System at either end of a representative unit of lumber 10. The unit 10 consists of one of more levels of boards laid side by side, which are referred to as "courses" such as 10a. Stationary device 21 is identical to device 20 except that it does not include the necessary input output devices for communicating to a remote system or a user. The device 21 communicates through it's Bi-Directional Communications Link 37 to Bi-Directional Communications Link 36 of device 20.

Figure 2:
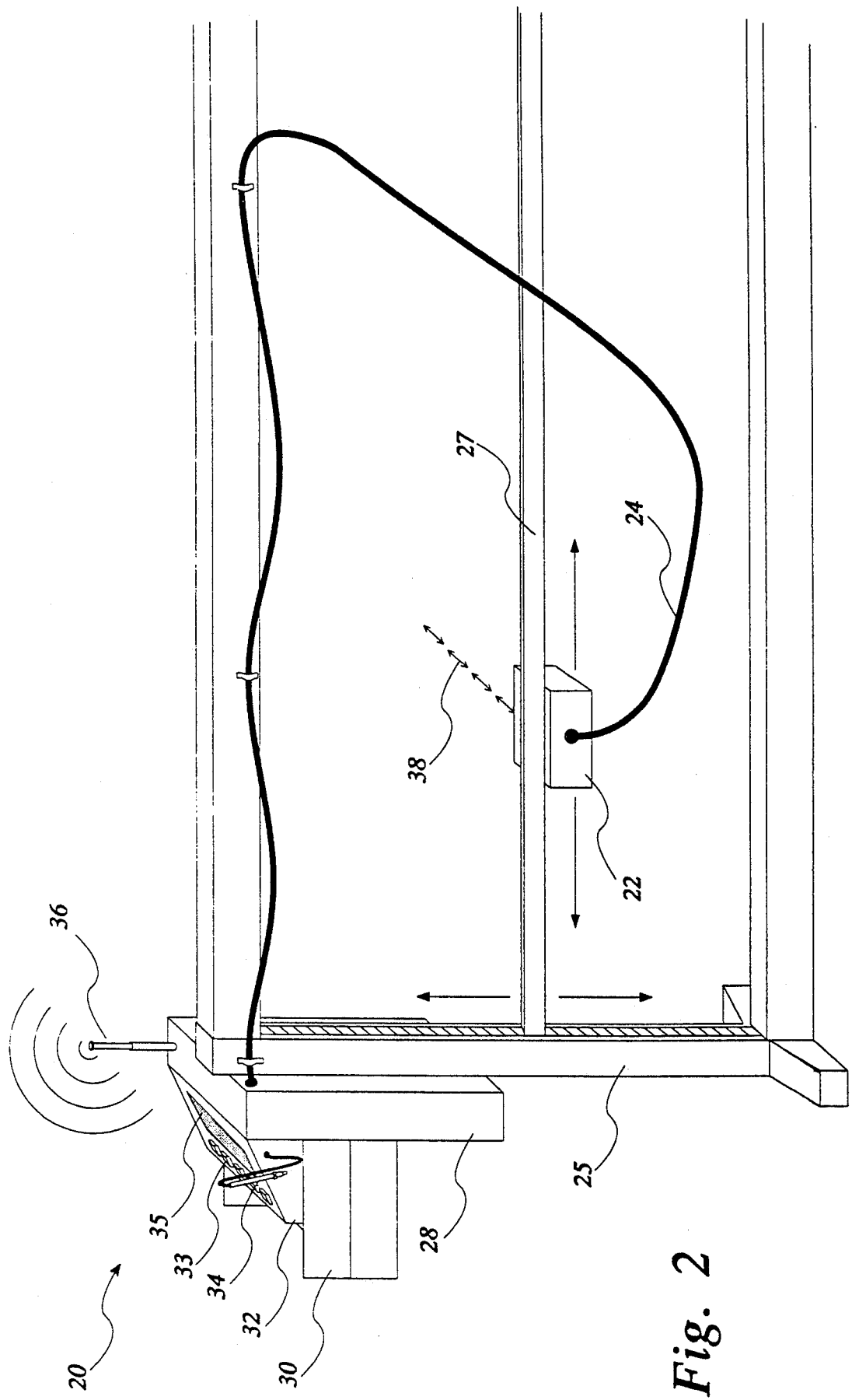
FIG. 2 is an enlargement of a portion of FIG. 1 showing some of the key elements of the system.

Referring to FIG. 2, an enlarged cropped view which further describes device 20, the focused beam scanning unit 22, is attached to the movable horizontal arm 27 which is attached to stand 25. The scanning unit 22 is capable of controlled horizontal movement along the movable horizontal arm 27. The arm 27 is capable of controlled vertical movement along the vertical axis of stand 25. Scanning unit 22 emits focused incident scanning energy beam 38 and receives the reflection of this beam off the end of the lumber unit 10. Thus, the scanning energy beam 38, can be controllably directed throughout the entire vertical-horizontal plane encompassed by the interior of the stand 26.

The scanning unit 22 produces a topological map of the end of unit 10. This surface map information is communicated along line 24 to computer 28. Computer 28 is attached to stand 25. Attached to computer 28 is encasement 30, for holding tag printer and tags, input/output panel 32, and bi-directional communications link 36. Further attached to 32, is bar code reader 34. As shown in FIG. 2, the input/output panel comprises keypad 33 and display panel 35.

Figure 3:
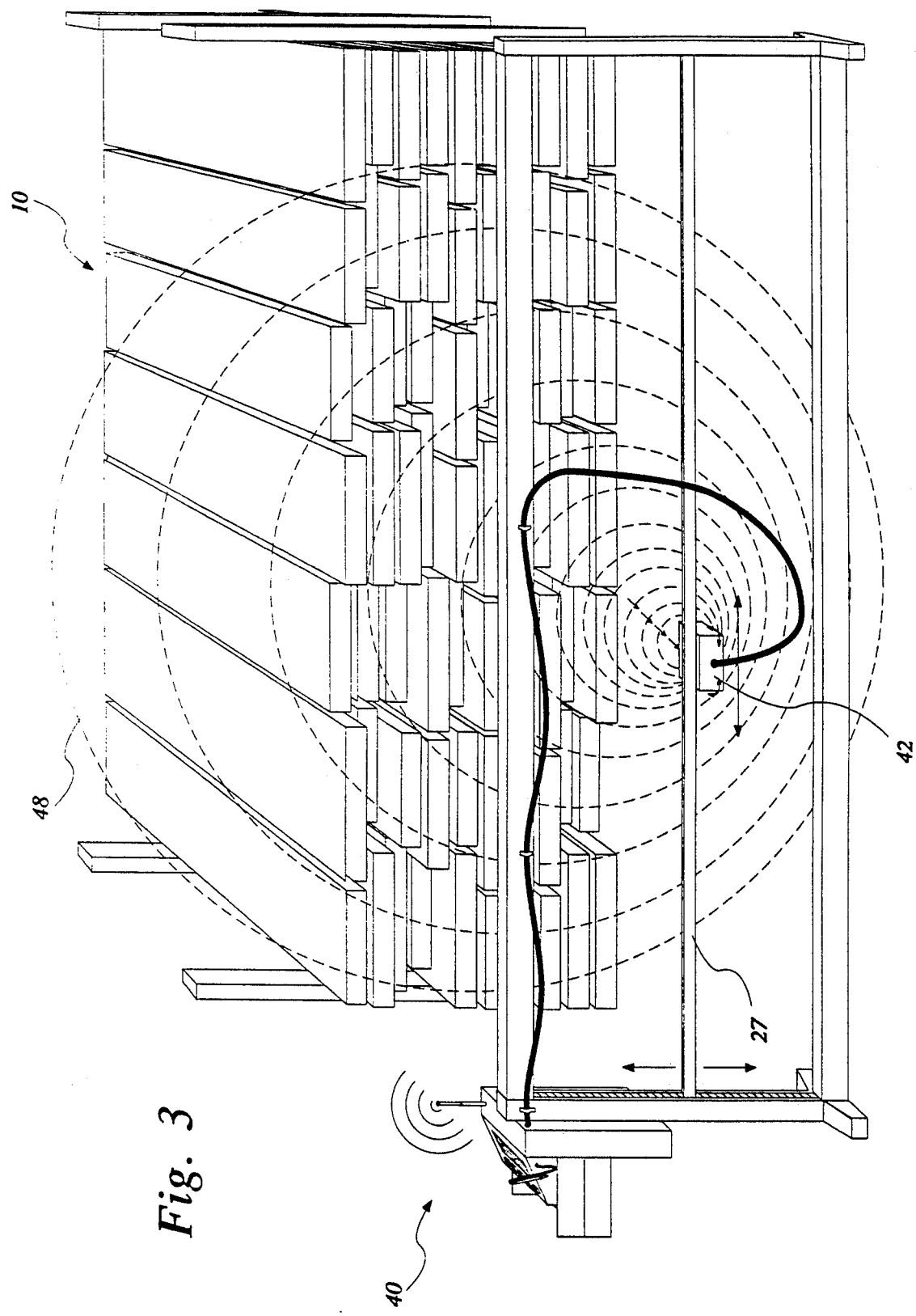
FIG. 3 is a perspective diagram of the preferred embodiment of a stationary "end tally" system based upon a movable spatial scanning unit. This system includes the same additional parts as in FIG. 1.

Referring to FIG. 3 there is shown a perspective drawing of an alternative embodiment 40 of the device 20 of the Automated End Tally System in front of a representative unit 10. The alternative embodiment 40 is identical to the embodiment 20 except the focused beam scanning unit 22 has been replaced by a spatial scanning unit 42. The scanning unit 42 is capable of controlled pivot movement on the horizontal arm 27. Scanning unit 42 receives reflected beams 48, from the end of unit 10, from which it constructs a topological map of the end of unit 10.

Figure 4:
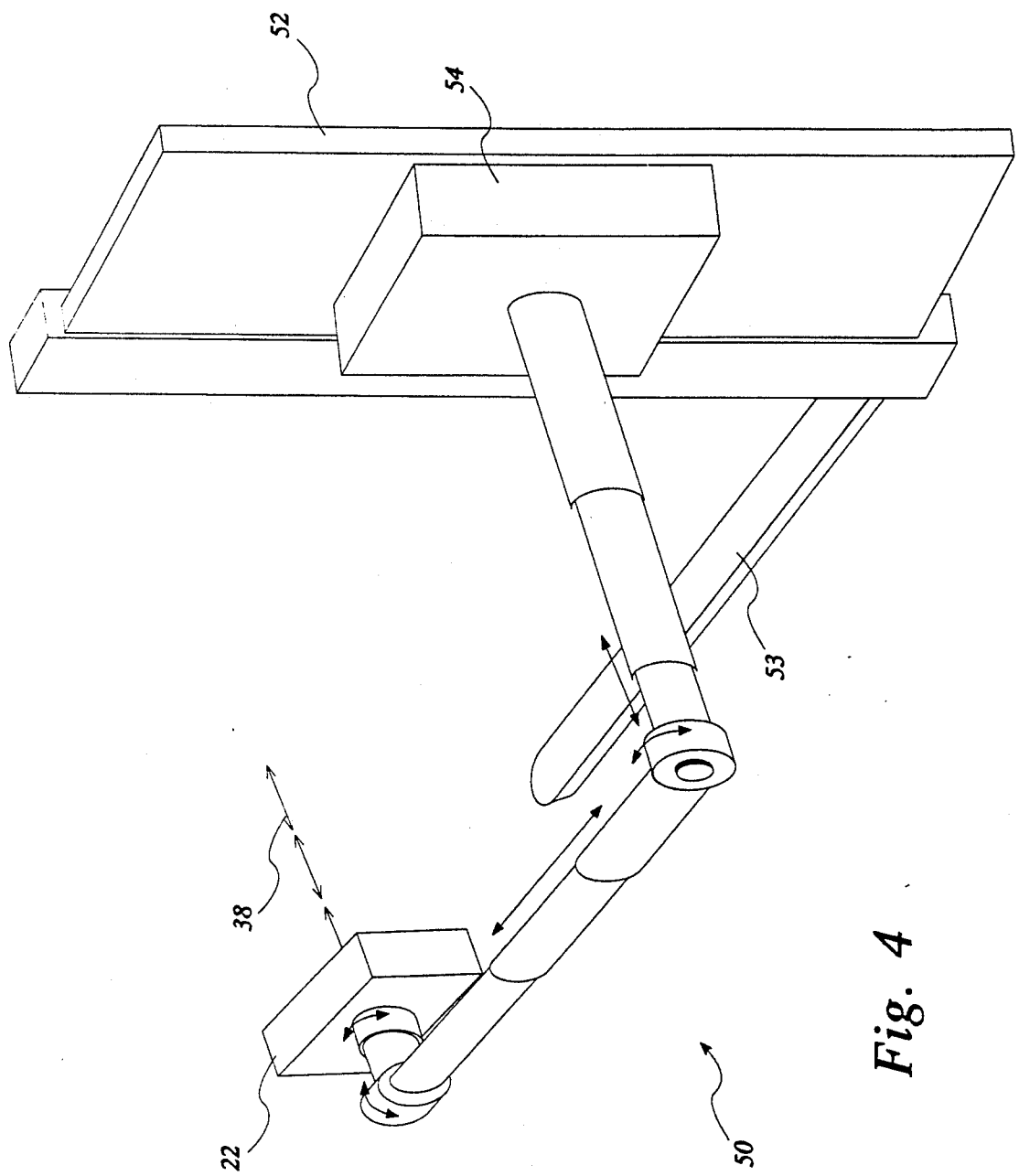
FIG. 4 is a perspective diagram of the movable focused beam scanning unit depicted in the system of FIG. 1, reconfigured into a unit which could be mounted to the side of a moving vehicle such as a fork lift.

Referring to FIG. 4 there is shown an alternative embodiment 50 of stand 25. The embodiment 50 comprises extendible arm 54 which is attachable to fork lift side 52. The focused beam scanning unit 22 is attached to the extendible arm 54. The extendible arm 54 is capable of moving the scanning unit 22 in order to obtain a topological map of one of the ends of a unit of lumber placed on fork lift load arm 53.

Figure 5:
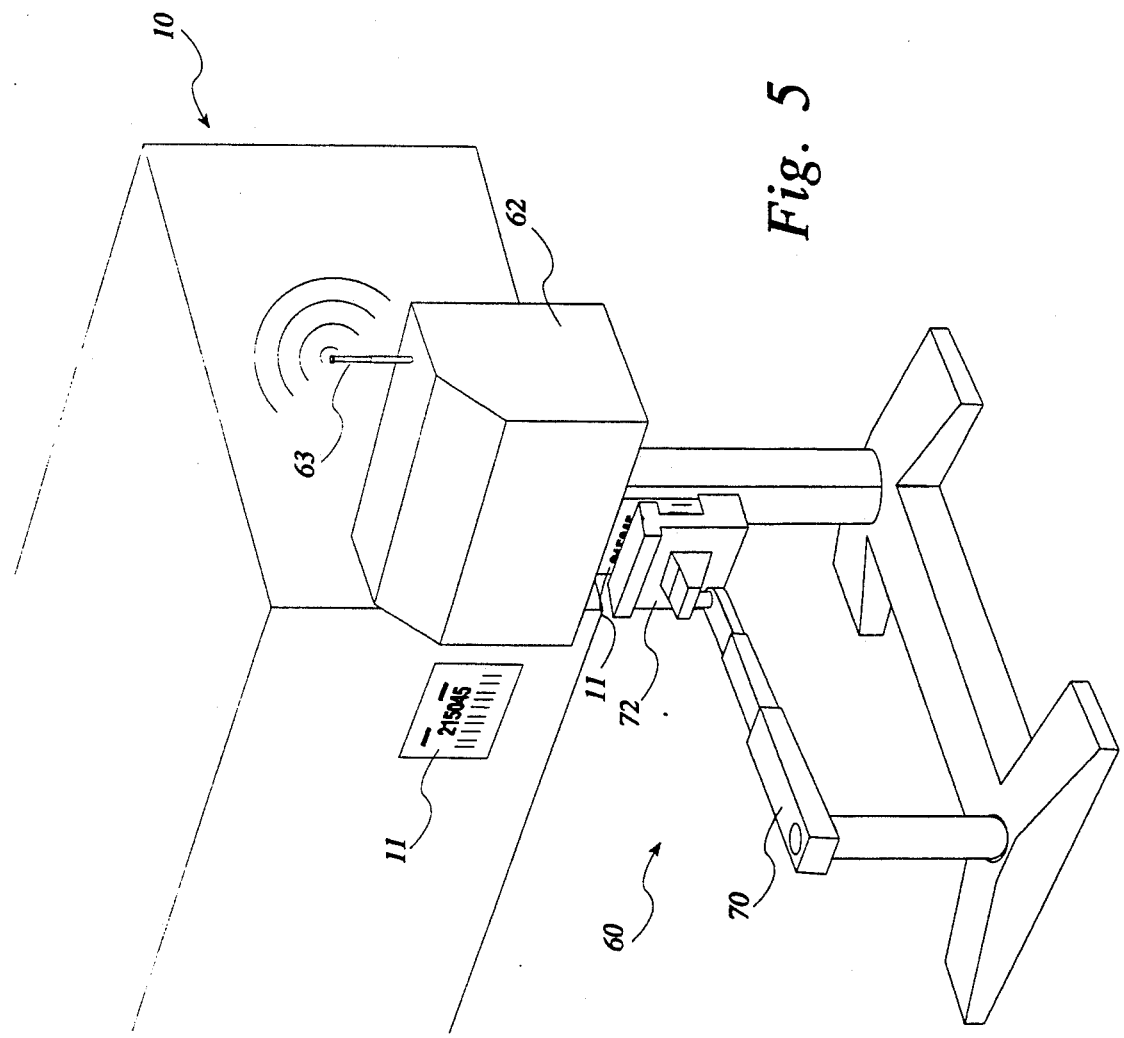
FIG. 5 is a perspective diagram of a Automated Tagging Sub-system which could be included into any of the previously shown alternative embodiments.

Referring to FIG. 5 there is shown an embodiment of an Automated Tagging Sub-system 60. The sub-system 60 comprises casement 62 which has attached movable arm 70 and attached Bi-Directional Communication Link 63. A grasping and stapling hand 72 is attached to the movable arm 70. The hand 72 is capable of movement in the horizontal plane which is parallel to the surface which supports the sub-system 60, such that it may go between the tag output section of the encasement 60 and the lumber unit 10 to which it attaches tag 11.

Figure 6:
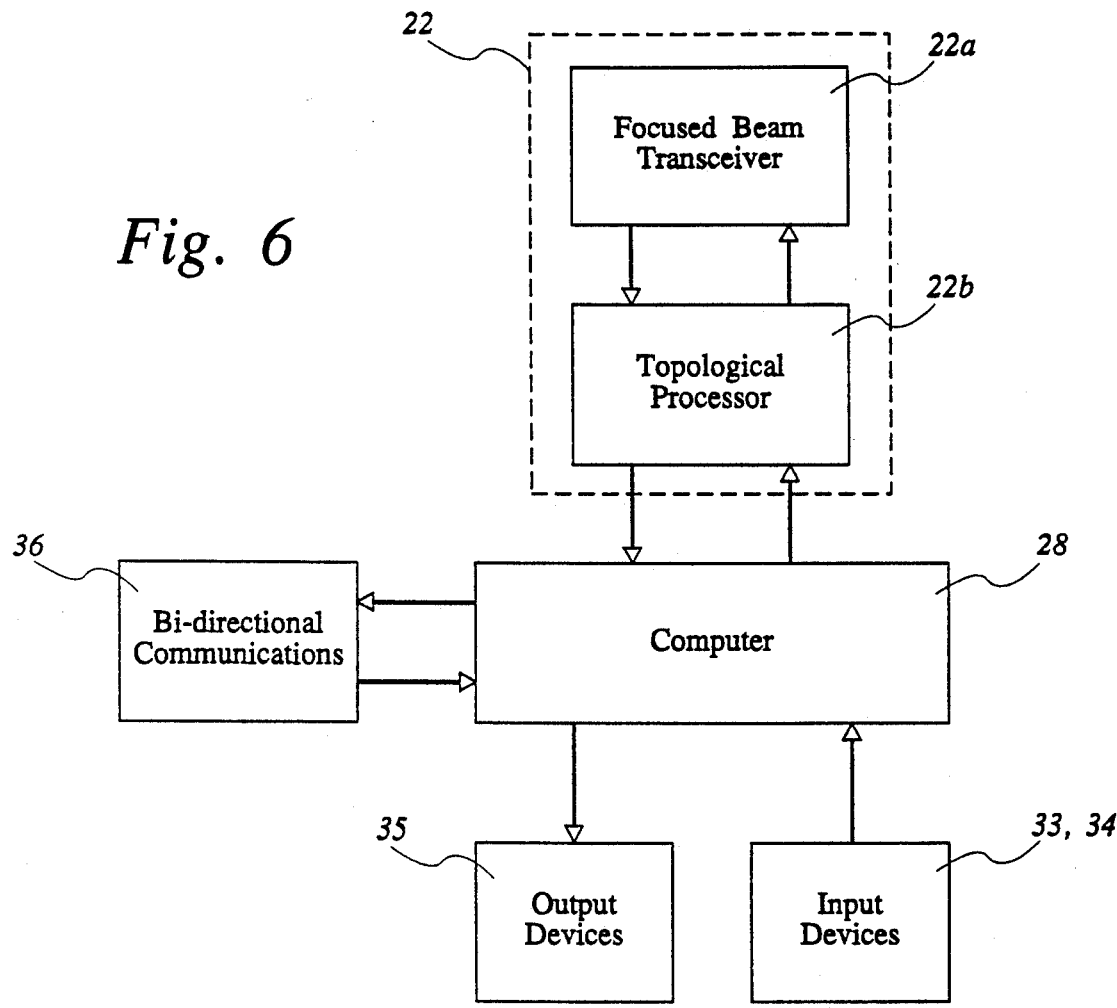
FIG. 6 is a block diagram for all of the embodiment of FIG. 1 depicting the major components which perform the present invention's stated functions.

Referring to FIG. 6, there is shown a block diagram of the embodiment 20 of the Automated End Tally System. Computer 28 receives information from the Input Devices such as keypad 33 and bar code reader 34. The computer 28 transmits information to the Output Devices such as the display screen 35 and a tag printer (not shown). Furthermore, the computer 28 both receives and transmits information from and to a remote system and the companion device 21 via the Bi-Directional Communications Link 36. The Link 36 is also used to communicate with the Automated Tagging Sub-system 60, shown in FIG. 5. The computer 28 also transmits controlling signals and receives topological map information from the focused beam scanning unit 22. The focused beam transceiver 22a, emits a focused beam and receives it's reflection off the end of the unit 10. This reflected information is input to the Topological Processor 22b. The Topological Processor 22b uses this information to create a topological map of the end of the lumber unit 10 which is input to the computer 28.

Figure 7:
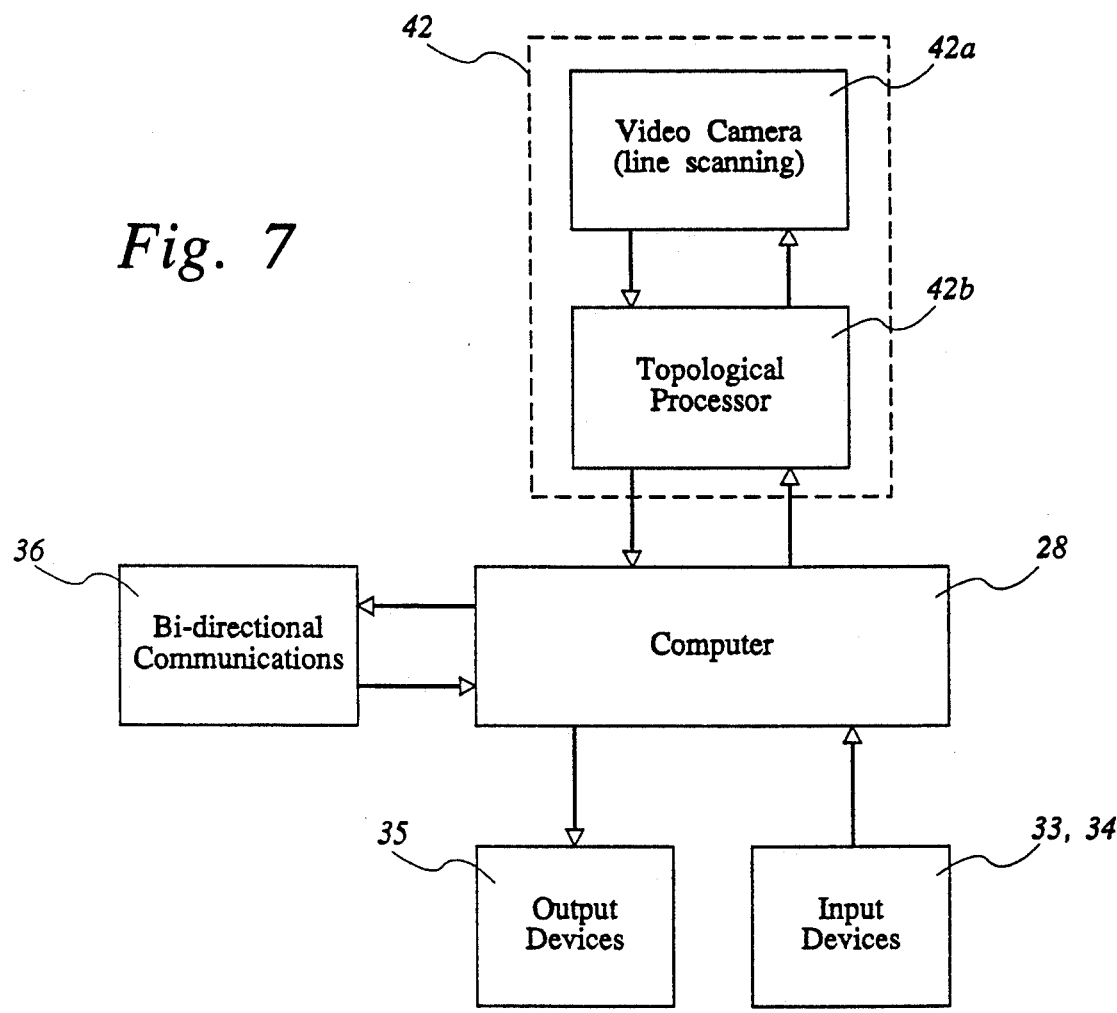
FIG. 7 is a block diagram for all of the embodiment of FIG. 3 depicting the major components which perform the present invention's stated functions.

Referring to FIG. 7, there is shown a block diagram of the embodiment 40 of the Automated End Tally System. It is identical to the block diagram shown in FIG. 6 of the embodiment 20 except that line scanning Video Camera 42a replaces Focused Beam Transceiver 22a. The reflected beam information, which is shown as 48 in FIG. 3, is input by the line scanning Video Camera 42a after which it is input to the Topological Processor 42b. The Topological Processor 42b uses this information to create a topological map of the end of the lumber unit 10 which is input to the computer 28.

Operation

Referring to FIG. 1, the Automated End Tally System is first installed by aligning stationary devices 20 and 21 so that a) they face each other with respect to the direction of their scanning energy beams 38 and 39, b) their stands 25 and 26 run parallel to each other, c) the perimeter outlined by the imaginary line running parallel along each stand and perpendicular between the ends of each stand forms a rectangle, and d) they are separated by enough distance to allow a forklift carrying a perspective unit to pass comfortably between them. Note that the strength of scanning energy beams 38 and 39 will dictate the furthest desirable separation of the two devices 20 and 21. These devices, 20 and 21, will then also need to be connected to a power source such as a typical AC outlet (this is not shown). The Automated End Tally System does not require a remote computer system to perform it's "end tally" counting, but if one is set up and equipped with a bi-directional communications link similar to 36, it may receive counted unit information automatically from device 20. When the two devices, 20 and 21, are turned on, their respective scanning units 22 and 23 automatically determine the distance between their respective stands 25 and 26. To do this, the devices 20 and 21 will use a technique exactly similar to that used for determining the distance from either stand to the nearest end of unit 10, as will be further described below.

After the Automated End Tally System has been installed, it may be used as follows. First, the desired unit to be counted is driven by a fork lift into the "space", or operating range, defined by the maximum scanning area of devices 20 and 21. As much as is possible, the unit 10 should be rested within the operating range of the system so that its length is perpendicular to the length of stands 25 and 26.

After the fork lift driver has rested unit 10 within the operating range of the Automated End Tally System devices 20 and 21, its presence is automatically detected and the "end tally" computation is initiated. The exact manner of detection and computation is dependent upon the particular embodiment of the stationary devices, i.e. either devices such as 20 or 40, with the possibility of a hybrid embodiment combining the two basic scanning methods of focused beam to measure depth (i.e. length) and spatial to measure thickness and width.

Referring to embodiment 20 of FIGS.' 1 and 2, the automatic detection of the presence of unit 10 is accomplished by periodically transmitting a pulsed focused beam and simultaneously thereafter receiving any reflections of the pulsed beam. When no unit 10 is present, there is no reflected beam. The embodiment 20, determines that unit 10 is at rest, and therefore ready to be counted, by any of several methods including the controlled horizontal movement of the scanning unit 22, in combination with the continued pulsed detection, until the edge of unit 10 is detected and determined to be at rest.

Scanning unit 22 then begins the "end tally" computation by first moving a predetermined distance along the horizontal arm 27 towards the opposite end of the unit 10 from that end first determined to be at rest. Once positioned, the horizontal arm 27 is moved in an upwards direction along the vertical axis of stand 25 while the scanning unit 22 continues to emit pulsed focused beams. Once no reflection is received, the movement of arm 27 is stopped. The horizontal arm 27 is then moved in a downward direction along the vertical axis of stand 25 while the scanning unit 22 emits focused beam. The focused beam 38 impinges upon the end surface of unit 10 thereby producing a reflected beam which contains information in accordance with the surface pattern of unit 10 and which is further received by scanning unit 22. Scanning unit 22 is then moved vertically downward continually inputting surface pattern information until the vertical bottom end of unit 10 is detected. As the reflected beam is received, a determination is made as to whether the vertical edge of each course (e.g. 10a) of the unit 10 has been transversed. Correlated with the known vertical position of the focused beam 38, this information provides the exact location of the upper and lower edges of each course (e.g. 10a) of unit 10, hence providing the exact location of the middle of each course. The scanning unit 22 is then returned the predetermined distance along the horizontal arm 27 to the original end of the unit 10 which was first detected to be at rest. Hence, it will be starting the "end tally" count from either the lower left or right corner of unit 10.

The scanning unit 22 is then vertically moved to the middle of each course after which it is moved horizontally to the opposite end of unit 10. During this movement the same technique is used to determine the beginning and ending edges of each board along the course. Based upon this information, both the thickness and width of each board in the course has been determined.

The final determination of board length is calculated from information which is obtained by pulsing focussed beam 38 during the horizontal scanning of each course, which is then used with similar information generated from the opposite end of unit 10 by device 21, which is transmitted by Bi-Directional Communication Link 37 to device 20, via Link 36. As previously mentioned, the two systems, 20 and 21, are separated by a known distance.

In summary, the end tally system utilizes information contained in reflected energy from the surface of unit 10 to determine both when to begin the "end tally" count and the exact dimensions of each board within the unit 10, all of which is topological information. Furthermore, while device 20 obtained topological information by controllably moving a focused scanning beam and receiving its reflected energy, device 40 continuously receives ambient reflected beams from its field of vision while controllably scanning the image created by this energy and hence capturing the image for later analysis. Similar to device 20, such analysis consists of determining the edges of each board within unit 10 by scanning the image and using standard edge detection digital signal processing algorithms. The distance from the scanning unit 42 to the edges of each board can be determined using phase information of two distinct views of the field of vision. This distance information, when combined with similar information from a device such as 21, positioned at the opposite end of unit 10, can be used to calculate board lengths.

In any case, no matter which method is used to determine the "end tally" of unit 10, the device 20 or 40 may then automatically transmit this information over its Bi-Directional Communications Link 36 to a remote system. This remote system may then respond by transmitting any related information such as a tag number to be assigned to the unit, which may then be transmitted along with the "end tally", by computer 28, to the Automated Tagging Sub-system 60 (FIG. 5) via the Bi-Directional Communications Links 36 and 63. If the remote system is not present, the Automated End Tally System may still transmit the "end tally" to sub-system 60 for printing and tagging. Along with the "end tally" and related information, the device 20 will also transmit the relative coordinates from the nearest corner of unit 10 to the bi-directional link 63 of the sub-system 60. Note that the input/output panel 32 and bar code reader 34 can both be used to enter related unit information into device 20 or 40 for ultimate transmission to the remote system and/or printing by sub-system 60. Such information might include the mill from which the unit was received, the species and grade of the lumber as well as an item number under which the unit should be classified.

Referring to FIG. 5, the Automated Tagging Sub-system 60, works as follows. It must initially be installed in a location near or within the operating range of the devices 20 and 21, at the corner of the operating range closest to the end of stand 25 to which computer 28 is attached. Sub-system 60 should be oriented so that its longitudinal axis runs parallel to that of stand 25. Furthermore, its attached moveable arm 70 must be capable of reaching the unit wherever it is most likely to be placed within the operating range. After it is installed and powered on, the Sub-system 60 will automatically send signals to devices 20 and 21 via its Bi-Directional Communications Link 63, which will be used by computer 28 to determine the relative location of Sub-system 60. This system must also be attached to a power source such as an AC outlet (not shown).

After receiving a transmission from the device 20, via its Bi-Directional Communications Link 63, sub-system 60 will commence to print a tag or release a pre-printed tag 11 into grasping and stapling hand 72. After receiving tag 11, the movable arm 70 will extend to move the grasping and stapling hand 72 up to unit 10 using the coordinates of the closest end of unit 10 as determined and transmitted by device 20. The hand 72 will then staple the tag 11 to unit 10 and retract to it's resting position.

Conclusion, Ramifications, and Scope of Invention

Thus the reader will see that the Automated End Tally System provides a system capable of counting bundled units of lumber without the aid of a human, with increased accuracy and in a minimum of time. The system is also capable of quickly inputting information related to the actual unit being counted and automatically transmitting this information to a companion computer system. Subsequently, the system is capable of receiving back from that companion system any information such as a "tag number" to assign to this unit. Based upon all of this information, the system is can automatically generate a printed tag and optionally attache that tag to the unit.

While the above description contains many specifications, these should not be construed as limitations on the scope of the invention, but rather as an exemplification of preferred embodiments thereof. Many other variations are possible. It is evident from the description of the Automated End Tally System that it has applicability beyond that of producing "End Tally's" from units of lumber. There are other industries, such as metal, which transfer their dimensional products in tagged groups. The extent to which the dimensions of the products within one of these groups vary, as with lumber, determines the relative difficulty of counting that group. One such example is a bundle of metal bars, usually of the same grade (alloy) and diameter, but often of varying lengths. It is therefore considered that the Automated End Tally System is in general capable of automatically determining the geometric attributes of all members of a common group of dimensional products that may have at least one varying dimension and translating these attributes into a count by dimension format for output. Accordingly, the scope of the invention should be determined not by the embodiments illustrated, but by the appended claims and their legal equivalents.

From the foregoing detailed description of the present invention, the Automated End Tally System, it will be apparent that the invention has a number of advantages, some of which have been described above and others and others of which are inherent in the invention. Also, it will be apparent that modifications can be made to the Automated End Tally System without departing from the teachings of the invention. Accordingly, the scope of the invention is only to be limited as necessitated by the accompanying claims.

We claim:

1. An automatic means for determining the tally count of a group of objects having substantially similar form, comprising:
    means for producing topological information relating to said objects comprising at least two orthogonal dimensions, and
    means for determining from said orthogonal dimensions, said tally count.

2. The invention of claim 1 wherein said means for producing said topological information comprises:
    means for automatically scanning each of said objects with energy,
    means for receiving reflected scan energy from said objects,
    means for determining from said reflected scan energy said topological information.

3. The invention of claim 1 wherein said objects are aligned along their longitudinal axis.

4. The invention of claim 3 wherein said topological information includes the dimension of the longitudinal axis of each of said objects.

5. The invention of claim 3 wherein said objects have end surfaces substantially perpendicular to said longitudinal axis.

6. The invention of claim 5 wherein said means for producing said topological information comprises:
    means for automatically scanning both end surfaces of each of said objects with energy,
    means for receiving reflected scan energy from said end surfaces of said objects,
    means for determining from said reflected scan energy said topological information.

7. The invention of claim 5 wherein said topological information comprises:
    similar orthogonal dimensions of said end surfaces of each of said objects, and
    the dimension of the longitudinal axis of each of said objects.

8. The invention of claim 5 wherein said means for determining from said orthogonal dimensions, said tally count comprises:
    means for classifying said objects into groups differentiated by said orthogonal dimensions of said end surfaces, and
    means for producing a count of the number of said objects within each of said groups.

9. The invention of claim 7 wherein said means for determining from said orthogonal dimensions, said tally count comprises:
    means for classifying said objects into groups differentiated by said orthogonal and said longitudinal dimensions,
    means for producing a count of the number of said objects within each of said groups.

10. An automatic means for determining the tally count of a group of objects having substantially similar form, which have been aligned along their longitudinal axis, comprising:
    means for producing topological information relating to said objects comprising the dimension of the longitudinal axis, and
    means for determining from said longitudinal dimension, said tally count.

11. The invention of claim 10 wherein said means for producing said topological information comprises:
    means for automatically scanning each of said objects with energy,
    means for receiving reflected scan energy from said objects,
    means for determining from said reflected scan energy said topological information.

12. The invention of claim 11 wherein said objects have end surfaces substantially perpendicular to said longitudinal axis.

13. The invention of claim 12 wherein said means for producing said topological information comprises:
    means for automatically scanning both end surfaces of each of said objects with energy,
    means for receiving reflected scan energy from said end surfaces of said objects,
    means for determining from said reflected scan energy said topological information.

14. The invention of claim 13 wherein said means for determining from said longitudinal dimension, said tally count comprises:
    means for classifying said objects into groups differentiated by said longitudinal dimension, and
    means for producing a count of the number of said objects within each of said groups.

15. A method for determining the tally count of a group of objects having substantially similar form, comprising the steps of:
    producing topological information relating to said objects comprising at least two orthogonal dimensions, and
    determining from said orthogonal dimensions, said tally count.

16. The invention of claim 15 wherein said step for producing said topological information comprises the steps of:
- automatically scanning each of said objects with energy,
- receiving reflected scan energy from said objects, and
- determining from said reflected scan energy said topological information.

17. The invention of claim 15 wherein said objects are aligned along their longitudinal axis.

18. The invention of claim 17 wherein said topological information includes the dimension of the longitudinal axis of each of said objects.

19. The invention of claim 17 wherein said objects have end surfaces substantially perpendicular to said longitudinal axis.

20. The invention of claim 19 wherein said step for producing said topological information comprises the steps of:
- automatically scanning both end surfaces of each of said objects with energy,
- receiving reflected scan energy from said end surfaces of said objects, and
- determining from said reflected scan energy said topological information.

21. The invention of claim 19 wherein said topological information comprises:
- similar orthogonal dimensions of said end surfaces of each of said objects, and
- the dimension of the longitudinal axis of each of said objects.

22. The invention of claim 19 wherein said step for determining from said orthogonal dimensioned, said tally count comprises the following steps of:
- classifying said objects into groups differentiated by said orthogonal dimensions of said end surfaces, and
- producing a count of the number of said objects within each of said groups.

23. The invention of claim 21 wherein said step for determining from said orthogonal dimensions, said tally count comprises the steps of:
- classifying said objects into groups differentiated by said orthogonal and said longitudinal dimensions, and
- producing a count of the number of said objects within each of said groups.

24. A method for determining the tally count of a group of objects having substantially similar form, which have been aligned along their longitudinal axis, comprising the steps of:
- producing topological information relating to said objects comprising the dimension of the longitudinal axis, and
- determining from said longitudinal dimension, said tally count.

25. The invention of claim 24 wherein said step for producing said topological information comprises the steps of:
- automatically scanning each of said objects with energy,
- receiving reflected scan energy from said objects, and
- determining from said reflected scan energy said topological information.

26. The invention of claim 25 wherein said objects have end surfaces substantially perpendicular to said longitudinal axis.

27. The invention of claim 26 wherein said step for producing said topological information comprises the steps of:
- automatically scanning both end surfaces of each of said objects with energy,
- receiving reflected scan energy from said end surfaces of said objects, and
- determining from said reflected scan energy said topological information.

28. The invention of claim 27 wherein said step for determining from said longitudinal dimension, said tally count comprises the steps of:
- classifying said objects into groups differentiated by said longitudinal dimension, and
- producing a count of the number of said objects within each of said groups.

29. An automatic means for determining the relative position of each object within a group of objects having edges and having substantially similar form comprising:
- means for producing topological information relating to said each object comprising the exact locations of each of said object's edges with respect to the entire group of said objects, and
- means for determining from said exact locations the relative positions of each object.

30. The invention of claim 29 wherein said means for producing said topological information comprises:
- means for automatically scanning each of said objects with energy,
- means for receiving reflected scan energy from said objects, and
- means for determining from said reflected scan energy said topological information.

31. The invention of claim 30 wherein said objects are aligned along their longitudinal axis and have end surfaces substantially perpendicular to said longitudinal axis.

32. The invention of claim 31 wherein said means for producing said topological information comprises:
- means for automatically scanning both end surfaces of each of said objects with energy,
- means for receiving reflected scan energy from said end surfaces of said objects, and
- means for determining from said reflected scan energy said topological information.

33. A method for determining the relative position of each object within a group of objects having edges and having substantially similar form, comprising the steps of:
- producing topological information relating to said each object comprising the exact locations of each of said object's edges with respect to the entire group of said objects, and
- determining from said exact locations the relative positions of each object.

34. The invention of claim 33 wherein said step for producing said topological information comprises the steps of:
- automatically scanning each of said objects with energy,
- receiving reflected scan energy from said objects, and
- determining from said reflected scan energy said topological information.

35. The invention of claim 34 wherein said objects are aligned along their longitudinal axis and have end surfaces substantially perpendicular to said longitudinal axis.

36. The invention of claim 35 wherein said step for producing said topological information comprises the steps of:

automatically scanning both end surfaces of each of said objects with energy, receiving reflected scan energy from said end surfaces of said objects, and determining from said reflected scan energy said topological information.

* * * * *